United States Patent [19]

Costantino, Jr et al.

[11] Patent Number: 5,144,152
[45] Date of Patent: Sep. 1, 1992

[54] RECTIFIER CABINET STATIC BREAKER

[75] Inventors: Roger A. Costantino, Jr, Mifflin; Ronald J. Gliebe, Library, both of Pa.

[73] Assignee: The United States of America as represented by the United States Department of Energy, Washington, D.C.

[21] Appl. No.: 530,513

[22] Filed: May 30, 1990

[51] Int. Cl.[5] ............................................. H02J 1/00
[52] U.S. Cl. ..................................... 307/11; 307/31
[58] Field of Search ............................. 307/11, 12, 31

[56] References Cited

U.S. PATENT DOCUMENTS

| | | | |
|---|---|---|---|
| 3,153,728 | 10/1964 | Procter | 307/31 |
| 3,337,741 | 8/1967 | Mislan | 307/41 |
| 3,619,635 | 11/1971 | Thompson et al. | 307/11 |
| 3,706,921 | 12/1972 | Rosen | 376/216 |
| 4,637,911 | 1/1987 | Bernard, Jr. | 376/217 |
| 5,006,301 | 4/1991 | Lexa | 376/216 |

Primary Examiner—Jeffrey A. Gaffin
Attorney, Agent, or Firm—Judy K. Kosovich; William R. Moser; Richard E. Constant

[57] ABSTRACT

A rectifier cabinet static breaker replaces a blocking diode pair with an SCR and the installation of a power transistor in parallel with the latch contactor to commutate the SCR to the off state. The SCR serves as a static breaker with fast turnoff capability providing an alternative way of achieving reactor scram in addition to performing the function of the replaced blocking diodes. The control circuitry for the rectifier cabinet static breaker includes on-line test capability and an LED indicator light to denote successful test completion. Current limit circuitry provides high-speed protection in the event of overload.

13 Claims, 4 Drawing Sheets

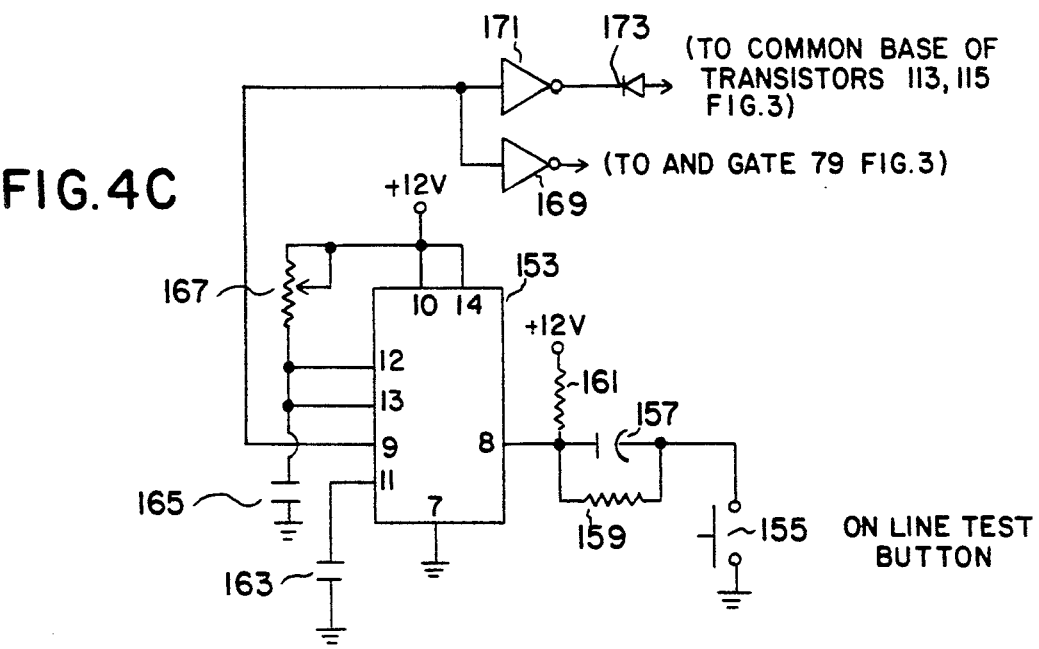
FIG.4C
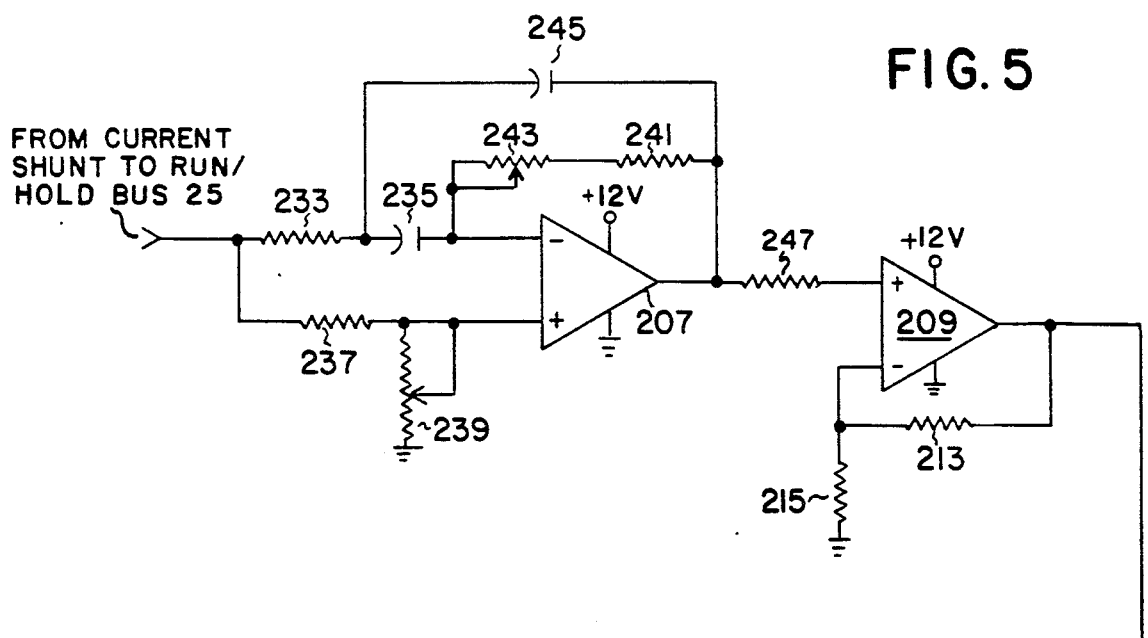
FIG.5
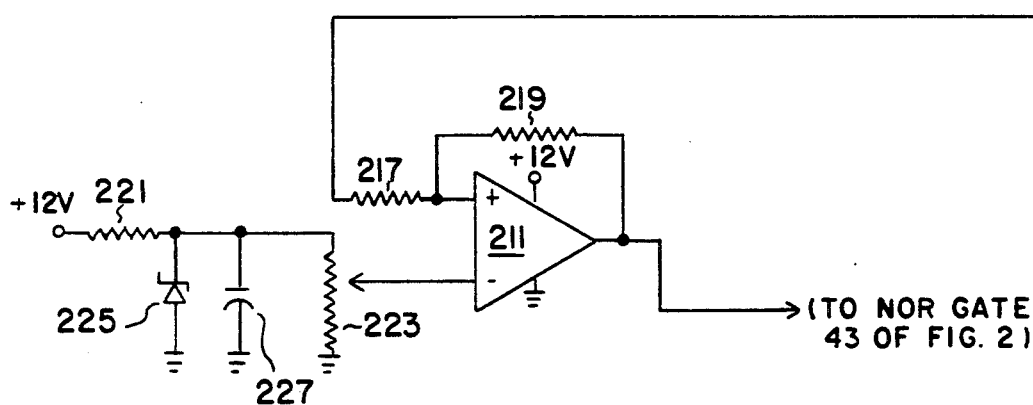

RECTIFIER CABINET STATIC BREAKER

CONTRACTUAL ORIGIN

The present invention was conceived and developed in the performance of United States Government Contract N00024-79C-4026.

FIELD OF THE INVENTION

The present invention relates generally to rod control power distribution systems and specifically relates to a power system rectifier cabinet which contains static breaker functions having controlled bus interruption and reconnection capability and built-in testability and indication of test completion.

DESCRIPTION OF THE PRIOR ART

A prior art rod control power distribution system utilizes two d.c. power bus voltages and controllable mechanical breakers. A higher voltage is needed for latching operations and is carried on a latch bus, while a lower voltage for normal run/hold operations is carried on a run/hold bus. When a latch contactor in the prior art system is closed and latch bus voltage is applied, a pair of parallel blocking diodes that are in series with the run/hold bus are reverse-biased and thus do not conduct. This blocks conduction of the run/hold bus. The prior art system has the disadvantage that it does not possess fast turn-off capability. In addition, the prior art system lacks on-line test capability.

The following three U.S. patents are considered as background material although they are not deemed pertinent to the present invention:

| U.S. Pat. No. | Date | Inventor |
| --- | --- | --- |
| 3,153,728 | October 20, 1964 | Procter |
| 3,337,741 | August 22, 1967 | Mislan |
| 3,619,635 | November 9, 1971 | Thompson et al. |

The Procter and Mislan patents are the only references of record in the Thompson et al. patent.

SUMMARY OF THE INVENTION

Against the foregoing background, it is a primary object of the present invention to provide a substantially improved breaker for the purpose of providing a viable alternate reactor scram control device contained within the rectifier cabinet.

It is another important object of the present invention to provide a rectifier cabinet static breaker that possesses fast turnoff capability.

It is a further important object of the present invention to provide a rectifier cabinet static breaker with on-line, built-in test capability.

It is an additional important object of the present invention to provide a rectifier cabinet breaker that achieves the foregoing objects and that at the same time produces a forward voltage drop that is substantially equivalent to that of a prior art system having blocking diodes and thus does not produce any significant increase in the need for cabinet heat dissipation.

To the accomplishment of the foregoing objects and advantages (among others), the present invention provides an alternate means of reactor scram operation, this being a rectifier cabinet static breaker in which an SCR (silicon controlled rectifier) is connected in a run/hold bus and replaces the pair of parallel blocking diodes of the prior art system.

A power transistor is connected in parallel with the latch contactor to supply a short pulse of latch bus voltage to commutate the SCR to the off (blocking) state. The SCR serves as a static breaker with fast turnoff capability providing an alternative way of achieving reactor scram in addition to performing the function of the blocking diodes that are replaced by the SCR.

A logic circuit interfaces between scram amplifier bus signals and the SCR, as well as with a bipolar transistor in a latch bus. The control circuitry for the rectifier cabinet static breaker includes on-line test capability and an LED indicator light to denote successful test completion. Current limiting circuitry provides high speed protection in the event of overload.

BRIEF DESCRIPTION OF THE DRAWINGS

The foregoing and still other objects, advantages and operation of the invention will be more apparent from the following detailed explanation of the preferred embodiment of the invention when read in connection with the accompanying drawings wherein:

FIG. 4C is the on-line test circuitry of FIG. 1.

FIG. 5 is a diagram of the current limiting circuitry of FIG. 1.

DESCRIPTION OF THE PREFERRED EMBODIMENT

Figure 1:
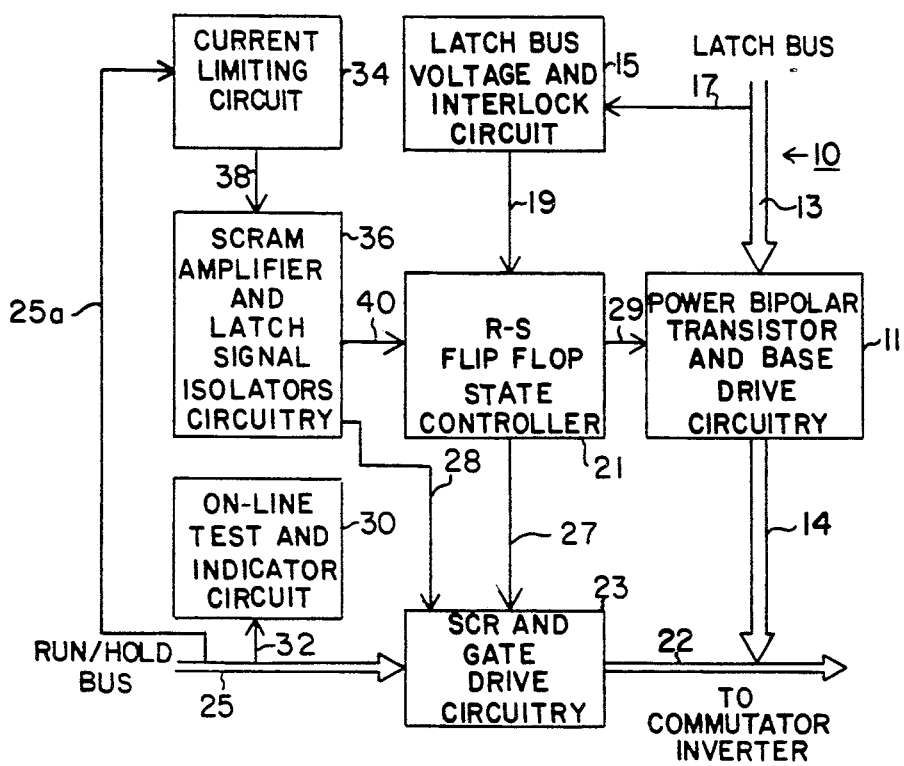
FIG. 1 is a block diagram of the preferred embodiment of rectifier cabinet static breaker.

FIG. 1 is a block diagram of a power system rectifier cabinet static breaker indicated generally at 10. This static breaker 10, which is installed within a rectifier cabinet, provides an improved means of reactor scram operation by replacing the blocking diode pair of the prior art rectifier cabinet with a silicon controlled rectifier (SCR) circuit that possesses controlled turnoff capability.

A power bipolar transistor and base drive circuit 11, FIG. 1, is connected to the latch bus 13 which is constructed to pass through the power rectifier cabinet via the normally-open latch contactor. This power transistor circuit 11 provides a parallel path for latch bus current and has the ability of quickly switching from conducting to the non-conducting state.

A latch bus voltage and interlock circuit 15 senses the voltage on the latch bus 13 through a line connection 17. This latch bus voltage interlock circuit 15 provides an output control signal 19 to an R-S flip-flop state controller circuit 21.

The SCR (silicon controlled rectifier) discussed above is connected as part of a SCR and gate drive circuit 23 which is inserted between run/hold bus 25 and commutator invertor bus 22.

A first control line 27 from the R-S flip-flop state controller circuit 21 controls the operation of the SCR and gate circuitry 23 while a second control line 29 from this circuit 21 controls the operation of the power transistor and base drive circuitry 11.

An on-line test and indicator circuit 30 is connected to the run/hold bus 25 through sensing line 32.

A current limiting circuit 34 is connected to the run/hold bus 25 through a line connection 25a. This current limiting circuit 34 has a control signal output 38 connected to the R-S flip-flop state controller 21 through the connection 38. The scram amplifier and latch signal isolator circuitry 36 provides a control signal 40 to the R-S flip-flop state controller circuit 21. The component implementation of the static breaker 10 will now be described with particular reference to FIGS. 2-5. The scram amplifier and latch signal isolators circuitry 36 of FIG. 1 can be viewed in greater detail in FIG. 2. This circuit, FIG. 2, contains three type 4N35 optical isolators, 31, 33, and 35, one each for each of three signals received. This circuit provides isolation of these signals from the logic control circuit power supply and the rod control bus voltages normally resident in the system. It also translates 33 volts d.c. and 115 volt d.c. signals to the 12 volt d.c. logic level for the control circuit 21 on FIG. 1.

The optical isolators 35 and 33 isolate input signals from scram amplifiers channels A and B, respectively. Each of these optical isolators 33 and 35 have an RC filter input comprising an 8.1K ohm resistor 37 and a one microfarad capacitor 39. This RC filter, 37 and 39, is intended to smooth out interruptions resulting from 7 millisecond signal interruptions (noise) during switch transfers which would otherwise cause an inadvertent scram. The output of each of these optical isolators 33 and 35 is biased to a logical "1" default state from a +12 volt supply connected through a 10K ohm resistor 41. The operation of either of the optical isolator circuits 33 or 35 produces a low going signal on the input of a logical NOR gate 43. This logical NOR gate 43 processes the scram signals and overcurrent signal and has its output connected into input of a 3 input AND gate 45.

This AND gate 45 has a second input from the signal line 19 connected to the latch bus interlock circuit 15. A third input to this AND gate 45 is connected from a switch 47 operated from an operator button 26 to supply a 12 volt "1" signal when the operator wishes to manually reset the RCSB to the conducting state.

The optical isolator circuit 31 is provided with a positive input signal from the latch contactor coil 49. The output from this first optical isolator 31 is passed through an inverting amplifier 51 and a 3K ohm current limiting resistor 53 to the base of a type 2N3725 transistor 55. The output of this transistor 55 is connected to SCR gate drive circuitry 23 at the common base connection of transistors 113 and 115.

The R-S flip-flop state controller 21 includes flip-flop 57 made from a pair of cross connected NOR gates. The non-inverted output of this flip-flop 57 is sent to the SCR and gate drive circuitry 23. The reset input of this flip-flop 57 receives an input signal from the output of NOR gate 43 which is first passed through an inverting amplifier 59 and then type 1N4001 diode 61 and then a 1K ohm current limiting resistor 63.

The set input of the flip-flop 57 receives a signal from the output of AND gate 45 through of type 1N4001 diode 65 and another 1K ohm resistor 67. A high signal placed on the set and reset inputs to the flip-flop 57 causes their corresponding outputs to go low. Otherwise, the inputs to this flip-flop 57 are held low by resistors 71 and 73. A pair of RC filters comprising a first and third 10K ohm resistors 71 and 73, tied from the reset input to ground and the set input to ground, respectively, as well as a pair of capacitors, these being a 0.01 microfarad 75 on the reset input and a 0.001 microfarad 77 on the set input of the flip-flop 57. These filters are biased to a logical "1" at power up from the 12 volt supply with a 10K ohm resistor to ground.

The non-inverted (Q) output of the flip-flop 57 is 12 volts which is a logical 1 value and corresponds to the on state of the SCR (silicon controlled rectifier). There are two exceptions to this. They are when the latch contactor 49 is closed and transistor 55 is "on" or when a self test signal has been issued each which override the flip-flop 57 output.

While resistors 71 and 73 are of equal value, capacitor 75 has a value ten times that of capacitor 77. This arrangement forces a sequence of R-S input signals, these being 1-1, 0-1, 00, respectively, which effects a true/inverting output of 0-1, respectively, at power up of the system to define an "off" state of the breaker.

With the R-S flip-flop 57 composed of NOR gates, a logical "1" input is required to cause a state change. Thus, the AND gate 45 and the inverting amplifier 59 can change the flip-flop 57 state by application of logical 1 signal through the respective diodes 65 and 61. AND gate 45 requires three conditions to be true before outputting the logical "1", namely, both scram buses are high, the latch bus voltage is present, and the operator is pressing the run/hold bus reset button 26. These conditions affect the flip-flop 57 logical signal Q-Q' outputs of 1-0, respectively, which directs the static breaker to the on state. The invertor 59 outputs a logical "1" if either or both scram amplifier buses revert to a low state which causes the output of NOR gate 43 to issue a logical "0". These conditions change the flip-flop 57 outputs Q—Q' to 0-1 which directs the static breaker to the off state.

Figure 3:
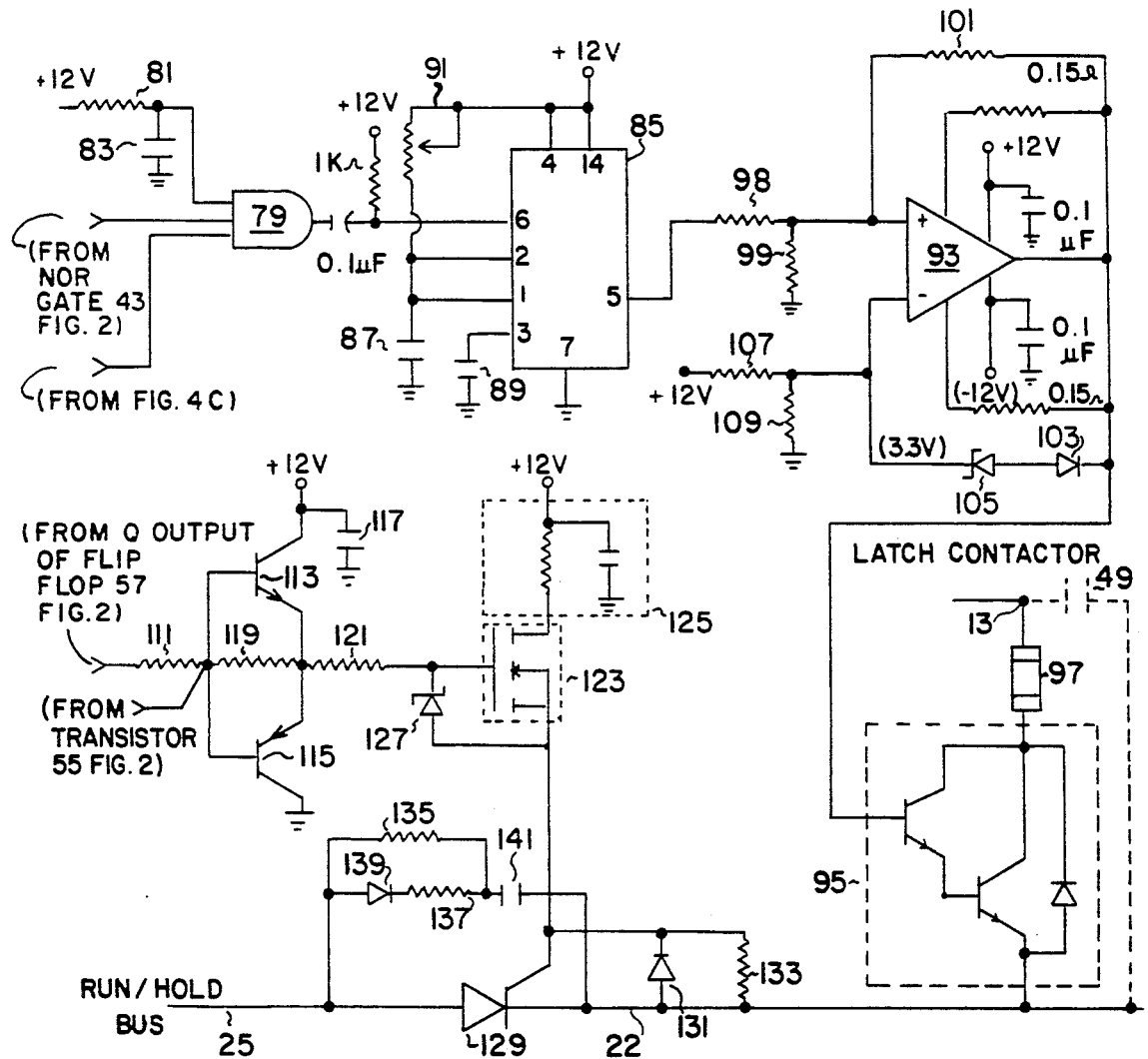
FIG. 3 is a diagram of the SCR and gate drive circuitry and of the power bipolar transistor and base drive circuitry of FIG. 1.

The power bipolar transistor and base drive circuitry 11, FIG. 1, is shown in greater detail in FIG. 3.

Here a three input AND gate 79 receives on the first input, a logical "1" which is created by the connection of a 10K ohm resistor 81 and capacitor 83 to form a low pass filter for noise elimination. On the second of its inputs, the output from NOR gate 43 is connected. The third input of AND gate 79 is connected from the on-line test circuitry 30 which will be described below.

The output of this AND gate 79 is input into a monostable timer circuit 85. This timer circuit is implemented by a Motorola integrated circuit type LM556. This integrated circuit has timing components connected to it in a standard manner for the desired pulse time of operation. Typically, it includes a pair of 0.1 microfarad capacitors 87, 89, and an adjustable 10K ohm resistor 91 connected on its input pins.

The output from this monostable timer 85 is input through a power operational amplifier 93 to the base of a bipolar darlington transistor circuit 95. The darlington transistor circuit 95 has its collector terminal connected through a 70 amp fuse 97 to the latch bus, and to the Commutator Invertor Bus 22 at the SCR cathode. This power transistor is connected in parallel with the latch contactor which is operated by the latch contactor coil circuit 49 of FIG. 2. Fuse 97, FIG. 3, in series with the power bipolar transistor 95 will clear if this power transistor fails shorted during the commutation of SCR 129. This transistor will, however, have applied a pulse of sufficient duration that it reverse biases SCR 129 and commutates it to the off-state by the time fuse 97 clears.

A voltage divider comprising a pair of 1K ohm resistors 98, 99 is inserted in series with the output connection from the monostable timer circuit 85 to the amplifier 93. This voltage divider transforms the 12 volt monostable output pulse to approximately 6 volts at the non-inverting terminal of the operational amplifier 93.

The power operational amplifier 93 includes a 51K ohm resistor 101 which provides a positive feedback to add hysteresis for stability. Amplifier 93 also includes a feedback from its output to its inverting input. This feedback loop includes the series connection of a diode 103 and a zener diode 105. zener diode 105 is implemented by a type 1N4728 zener diode, while diode 103 is implemented by a 1N4001 type diode.

The inverting input of this amplifier 93 is normally held to approximately 3 volts d.c. by a resistor divider implemented by a 3K ohm resistor 107 and a 1K ohm resistor 109 connected from the 12 volt supply to ground. Diode 103 and zener diode 105 turn on when the output from the amplifier 93 goes low causing the 3 Volt reference voltage at its inverting input to be pulled to ground. The amplifier 93 output is limited to −4 volts d.c. and is thus prevented from swinging down to the negative supply rail voltage of −12 d.c. The −4 volts signal enhances turn off of the power bipolar darlington transistor pair 95 and does not exceed the maximum allowable reverse bias base-emitter voltage rating of that transistor circuit 95.

A low input signal on the AND gate 79 results when the scram bus is low or an on-line test has been requested by the operator. A low output pulse from the AND gate 79 causes the monostable timing circuit 85 to issue a positive pulse of a time duration set by the adjustable resistor 91 and the timing capacitor 87. The operational amplifier 93 acts as a voltage comparator regarding the voltage placed on its inverting input and issues a positive pulse to turn on the power bipolar darlington transistor.

Figure 2:
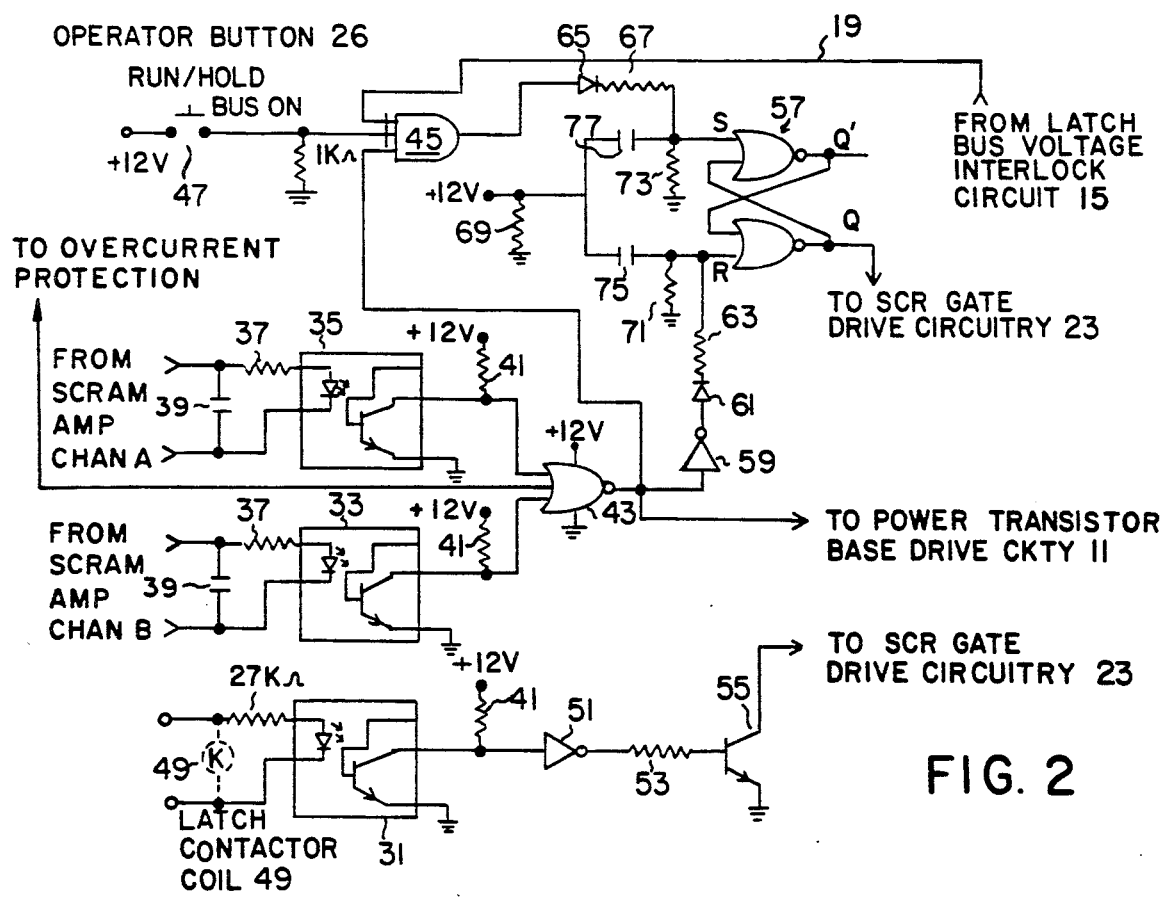
FIG. 2 is a diagram of the scram amplifier isolators circuitry latch signal isolator circuitry, and the R-S flip-flop state controller circuitry of FIG. 1.

The SCR and gate drive circuitry 23 of FIG. 1 is likewise implemented by circuitry which can be seen in FIG. 3. Here, the output from flip-flop 57 of FIG. 2 is fed through a 3K ohm resistor 111 to a totem pole transistor amplifier comprising the transistors 113 and 115. The collector of transistor 113 is connected to +12 volts d.c., with a capacitor 117 added to provide decoupling (i.e., stiffness to the supply rail voltage) while the collector of transistor 115 is connection directly to ground. Transistor 113 is implemented with a type NPN 2N3725 transistor while transistor 115 is implemented by a type PNP 2N3244 transistor. The emitters of each transistor 113 and 115 are tied together to form the output and include a 30K ohm feedback resistor 119 connected to their respective bases. The output of this totem pole transistor amplifier is fed through a 10 ohm resistor 121 to the gate node of a N-Channel MOSFET transistor 123 implemented by a 1RF532 type device.

The MOSFET transistor 123 has its drain connected to +12 volts d.c. through a RC filter 125 implemented with an 8 ohm resistor and a 0.1 microfarad capacitor connected to ground. Zener diode 127 limits the gate-to-source voltage to protect the MOSFET from potential damage. The zener diode 127 is implemented by a type 1N4744 diode.

A silicon controlled rectifier SCR 129 is connected in series with the run/hold bus 25. This SCR 129 is implemented by a type 153-T9G0081203DH device rated at 1200 amps and 800 volts.

A diode 131 and 200 ohm resistor 133 are connected in parallel between the gate and cathode junction of the SCR 129. Diode 131 is a type 1N4001 diode. This diode 131 and resistor 133 define the "off" state for the SCR 129 by slightly reverse biasing the gate-to-cathode junction to approximately −0.7 volts at turn off with the transistor 113 and the MOSFET transistor 123 off and transistor 115 on.

A snubber network is composed of a 10 ohm resistor 135 and the series connection of a 3 ohm resistor 137 and a type MR826 diode 139. This parallel circuit is connected in series with a 10 microfarad capacitor 141 to form the network which ties the anode-to-cathode terminals of the SCR 129. The cathode terminal of the SCR 129 is connected to the emitter of the second stage transistor of the darlington transistor circuit 95 at line 22 by line 14.

The snubber network composed of the resistors 135, 137, the diode 139 and the capacitor 141 restrict the rate of rise of anode to cathode voltage at turn off of the SCR 129. This avoids spurious turn on. At the turn off of the SCR 129, diode 139 is "on" and transient current flows through parallel path formed by the resistor 135 and the resistor 137 into the capacitor 141. When the SCR 129 is gated back to the "on" state, the diode 139 blocks the flow of current and the discharge current of the capacitor 141 is restricted to flow only through the resistor 135. This design reduces the thermal loading on the SCR 129 which would be caused by a sudden in rush of current before the SCR 129 anode to cathode voltage is reduced to the "on" state level.

Figure 4A:
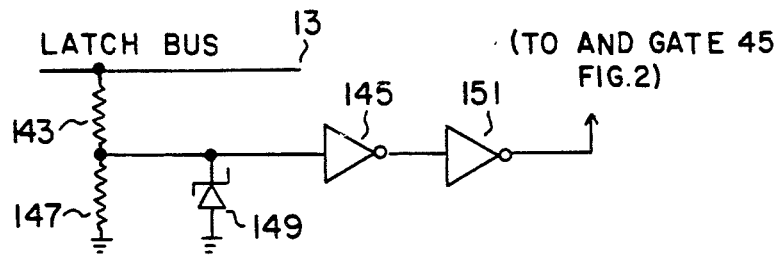
FIG. 4A is the latch bus voltage and interlock circuitry of FIG. 1.

Latch bus voltage interlock circuit 15 on FIG. 1 includes circuit implementation as shown in FIG. 4a. A 23K ohm resistor 143 connects the latch bus 13 to the input of an inverting amplifier 145. The input of this amplifier 145 is connected to ground through a 10K ohm resistor 147 and a type 1N4742 zener diode 149 with the resistor 147 and diode 149 connected in parallel. The resistor 143 and resistor 147 as well as the diode 149 provide a 12 volt logical "1" signal when the latch bus 13 voltage is "on". The output of the invertor amplifier 145 provides a logical "0" to a second invertor amplifier 151 which then has its outputs connected to an input of AND gate 45 on FIG. 2.

Figure 4B:
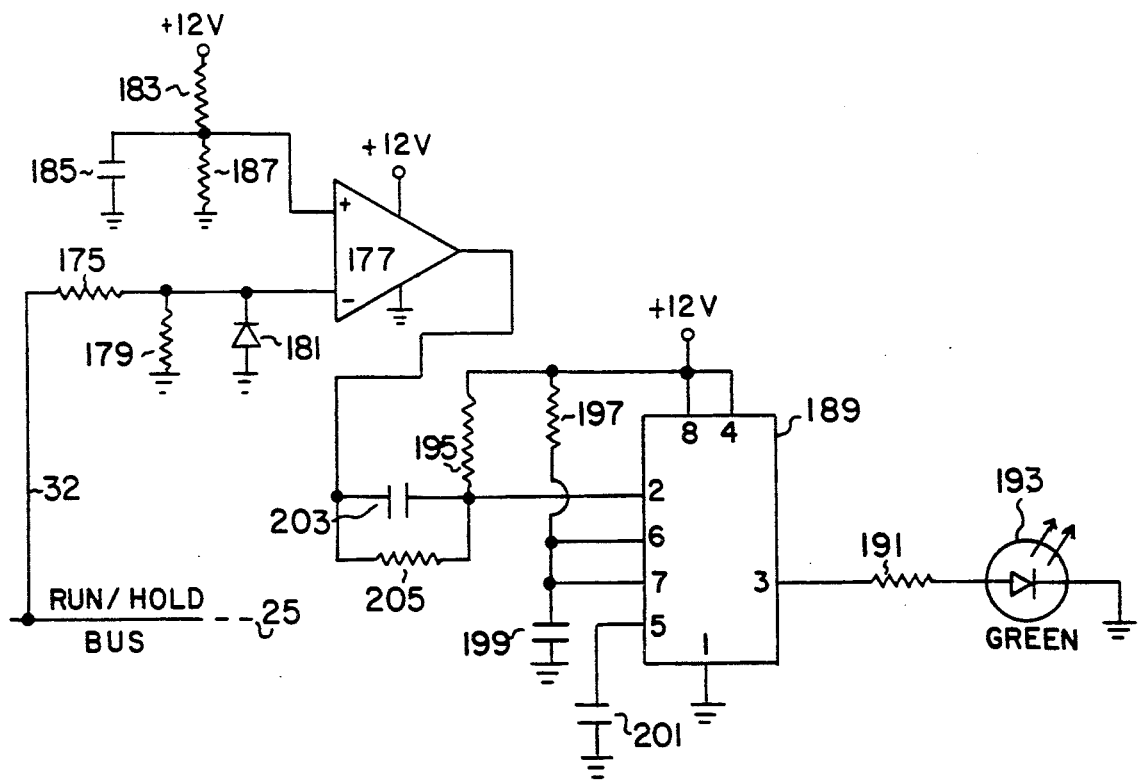
FIG. 4B is the on-line indicator circuitry of FIG. 1.

The on-line test and indicator circuit 30 of FIG. 1 is implemented by the two circuit implementations FIG. 4b and 4c. A monostable timer 153, implemented by a type LM556 integrated circuit, FIG. 4c, is triggered by the on-line test button 155 activated by test personnel. The monostable timing circuit 153 includes the series connection of a 0.1 microfarad capacitor 157 and a 10K ohm resistor 159. The inputs to the monostable timing circuit 153 are connected to +12 volts d.c. through a 1K ohm resistor 161. The capacitor 157 and the resistors 159, 161 prevent long duration output pulses that could otherwise result if the operator holds the on-line test button 155 down (in contact).

The monostable timing circuit 153 includes 0.1 microfarad capacitors 163, 165 and an adjustable 10K ohm resistor 167. These operate according to the manufacturer's suggestions for determining the pulse width or pulse duration generated from the monostable timer 153. The output from this timer 153 is sent to AND gate 79 of FIG. 3 through an inverting amplifier 169 and to the common base connection of transistors 113 and 115 of FIG. 3 through the series connection of invertor gate 171 and reverse connected diode 173. Diode 173 is implemented by a type 1N4001 diode.

Run/hold bus 25 is connected through line 32 and a 22K ohm resistor 175, FIG. 4b, to the inverting input of an analog voltage comparator 177. The parallel connection of a 2K ohm resistor 179 and a type 1N4001 diode 181 is likewise connected between ground and the inverting input of the analog voltage comparator 177. The resistors 175 and 179 sense the run/hold voltage on bus 25 when the SCR 129 of FIG. 3 is "off" (in the blocking state) and provide an 8 volt signal to the inverting input of the comparator 177. The non-inverting input of this comparator 177 is fed a "4 volt" signal from the 12 volt supply through a 2K ohm resistor 183. The non-inverting input has a 0.1 microfarad capacitor 185 and a 1K ohm resistor 187 connected in parallel to ground which filters off noise.

Comparator 177 has its output connected into a monostable timer circuit 189. This monostable timer circuit 189, like the others, is implemented by a type LM555 integrated circuit. The output of this monostable timer circuit 189 is connected through an 820 ohm current limiting resistor 191 to a signal light 193.

A series connected resistor 197 (5 megohms) and capacitor 199 0.1 microfarad set the duration of the high (conducting) state output pulse from the monostable timer circuit 189 to approximately one-half second. A further 0.1 microfarad capacitor 201 stabilizes the circuits internal reference voltage.

The series connection of a 0.1 microfarad capacitor 203 and a 62K ohm resistor 205 on the triggering input of the monostable timer circuit 189 assures that the circuit latches into its operating state positively and does not flicker on and off with stray signals on the input signal line.

The current limiting circuit 34 of FIG. 1 is implemented as shown in FIG. 5. This circuit utilizes three identical operational amplifiers 207, 209 and 211. These amplifiers are implemented by type LM324 amplifier circuits. The amplifier 209 has a feedback resistor divider comprising a 100K ohm resistor 213 and a 1K ohm resistor 215 and introduces a gain factor of 100 to transcend the signal amplitude to a level suitable for comparison with a reference voltage that is chosen to be large compared to typical operational amplifier offset (error) voltages. The output of this second operational amplifier 209 is fed into the third operational amplifier 211 which acts as a comparator. The series connection of 1K ohm resistor 217 on the non-inverting input of the third amplifier 211 in conjunction with a 200K ohm feedback resistor 219 that provides positive feedback for hysteresis to promote stability of this third amplifier 211.

A reference voltage is established on the inverting input of this amplifier 211 from the 12 d.c. supply through a 500 ohm resistor 221 and an adjustable 10K ohm resistor 223 connected to ground. The wiper from the 10K ohm resistor 223 is connected to the inverting input of the amplifier 211.

A type 1N4736 zener diode 225 and a 0.5 microfarad capacitor 227 are connected in parallel to ground from a point between the connection of the resistors 221 and 223. This diode 225 and capacitor 227 operate to reduce and eliminate transient noise on the reference voltage signal to the inverting input of the amplifier 211.

The output from amplifier 211 is fed to a third input of NOR Gate 43 of FIG. 2. An over current signal is processed as a scram signal.

The first operational amplifier 207 receives an input signal from the current shunt to the run/hold Bus 25 through a series connection of a 62 ohm resistor 233 and a 0.1 microfarad capacitor 235 to its inverting input. A like signal, is input to the non-inverting input of this amplifier 207 through a voltage divider comprised of a 20 ohm resistor 237 and a 100 k ohm adjustable resistor 239. The gain of this operational amplifier 207 is adjusted through the series feedback connection of a 330 k resistor 241 and an adjustable 10 k ohm resistor 243. Around this series connection of resistors 241 and 243 is connected a 0.1 microfarad capacitor 245, this being from the output of the amplifier 207 to the junction of resistor 233 and capacitor 235.

The operational amplifier 207 and its associated components form a "band-stop" or notch filter that allows passage of the DC current shunt steady state signal and transient changes but rejects the 360 Hz ripple from the three phase full wave rectifier bridge. The operational amplifier 207 subtracts the result of a bandpass circuit formed by the capacitors 235, 245 and resistors 233, 241 and 243 from unity to obtain the bandstop function. The resistors 237 and 239 provide a near unity gain input signal to the non-inverting input of this amplifier 207 and allow adjustment to compensate for the operational amplifier 209 inherent error due to manufacturing imperfections.

The resistor 217 and resistor 219 provide positive feedback to introduce hysteresis for stability of the amplifier 211. Resistor 221 and diode 225, as well as capacitor 227 provide a stable regulated voltage of 6.5 volts from the 12 volt supply line to the inverting input of the amplifier 211. The adjustable resistor 223 allows the operator to set the upper limit of load current by noting that each reference volt is equivalent to 100 amps of load current.

The invention therefore provides a static breaker circuit for breaking or otherwise interrupting the flow of current through a bus utilizing electronic means as opposed to the electromechanical means previously employed. Likewise, the intrigue role on-line test feature has been incorporated. This circuit provides an alternative means of accomplishing reactor scram. The SCR circuit forward voltage drop is equivalent to that of the blocking diodes it replaced in the previous structure used for circuit interruption. Therefore the SCR does not produce any significant increase in cabinet heat dissipation.

As changes can be made in the invention without departing from the intent and scope thereof it is intended, that the above disclosure is to be interpreted as illustrative of the invention and not that the invention is to be limited to the above described embodiment.

What is claimed is:

1. In a power distribution system rectifier cabinet, a static breaker apparatus comprising:
   a latch bus;
   a run/hold bus;
   a SCR (silicon controlled rectifier) circuit inserted in said run/hold bus; and
   sensing circuitry connected to said latch bus and monitoring the status of power thereon, said circuitry also being connected to control the conducting state of said SCR, wherein said sensing circuitry includes:
   a power bipolar transistor and base drive circuitry connected into said latch bus;

a latch bus voltage interlock circuit connected to sense the condition of said latch bus; and an R-S flip-flow state controller circuit connected to said latch bus voltage interlock circuit, said R-S state controller circuit being connected on a first output to said power bipolar transistor and base drive circuitry and one a second output to said SCR circuit.

2. The apparatus of claim 1 wherein said sensing circuitry also includes:
a current limiting circuit connected to said run/hold bus;
a SCRAM amplifier isolator circuit connected to said R-S flip-flop state controller circuit; and
a latch signal isolator circuit connected to said SCR circuit.

3. The apparatus of claim 2 wherein said sensing circuitry also includes an on-line test and indicator circuit connected to said run/hold bus.

4. The apparatus of claim 3 wherein said SCR and gate drive circuitry includes:
a power SCR circuit connected in series into said run/hold bus to interrupt the operation of same;
a totem pole transistor pair circuit connected to said SCRAM amplifier and latch signal isolators circuitry output; and
a MOSFET transistor circuit connected to the output of said totem pole transistor pair circuit, wherein said MOSFET transistor circuit output is connected to control the conduction state of said power SCR circuit.

5. The apparatus of claim 4 wherein said power bipolar transistor and base drive circuitry includes:
a first AND gate circuit connected to receive inputs from said scram amplifier isolator circuit and on-line test circuit 3;
a first monostable timing circuit connected to the output of said first AND gate circuit;
a comparator amplifier connected to the output of said first monostable timing circuit;
a power transistor connected to the output of said comparator amplifier; and
wherein said power transistor output is connected to apply said latch bus potential.

6. The apparatus of claim 5 wherein said SCRAM amplifier and latch signal isolator circuit includes:
a first optical isolator circuit connected on its input to said SCRAM amplifier;
a second optical isolator circuit connected on its input to said SCRAM amplifier;
a NOR gate connected on an input to the output of said first optical isolator circuit and on a second input to the output of said second optical isolator circuit;
a third optical isolator circuit connected on an input across a latch connector coil;
an inverting amplifier connected on its input to the output of said third optical isolator circuit; and
a transistor circuit connected on its base terminal to said inverting amplifier output and on its output to said SCR and gate drive circuitry totem pole transistor pair base terminals.

7. The apparatus of claim 6 wherein said R-S flip-flop state controller circuit includes:
an operator run/hold bus reset contact button for providing a 12-volt reset signal;
an AND gate connected on a first input to receive a signal from said SCRAM amplifier isolator circuit NOR gate output, on a second input to receive a signal from said operator run/hold bus reset contact button, on a third input to receive a signal from said latch bus voltage interlock circuit;
an inverting amplifier circuit connected to the output of said SCRAM amplifier isolator circuit NOR gate output; and
a flip-flop circuit being connected on its reset input to said inverting amplifier circuit output, on its set input to said AND gate output and being connected on its non-inverting output to said SCR and gate drive circuitry and its inventory output to said power bipolar transistor and base drive circuitry gate input.

8. The apparatus of claim 7 wherein said latch bus voltage and interlock circuit includes:
a resistor voltage divider connected to said latch bus;
a first inverting amplifier connected to the output of said voltage divider; and
a second inverting amplifier having its input connected to the output of said first inverting amplifier and its output connected to said R-S flip-flop state controller circuit AND gate input.

9. The apparatus of claim 8 wherein said on-line test and indicator circuit includes:
a manually operable test button;
a first monostable timer circuit, being connected on an input to said test button and being adjusted to generate a pulse signal of predetermined length;
a first inverting amplifier connected with its input to the output of said first monostable timer circuit and with its output to said R-S flip-flop state controller circuitry AND gate input; and
a second inverting amplifier connected with its input to the output of said first monostable timer circuit and on its output to said power bipolar transistor and gate drive circuitry AND gate input.

10. The apparatus of claim 9 wherein said on-line test and indicator circuit also includes:
an analog voltage comparator circuit connected with its inverting input to said run/hold bus;
a reference voltage divider connected to said analog voltage comparator on its non-inverting input;
a second monostable timer circuit connected with its input to the output of said analog voltage comparator and being adjusted to generate an output signal of predetermined length; and
a signal light circuit connected to the output of said second monostable timer circuit.

11. The apparatus of claim 10 wherein said current limiting circuit includes:
a first operational amplifier circuit;
a first voltage divider circuit connecting said run/hold bus current sensor to a first input of said first operational amplifier;
a first bandstop filter circuit connecting said run/hold bus shunt to a second input of said first operational amplifier;
a second operational amplifier circuit connected on a first input to the output of said first operational amplifier and having a gain factor established by a feedback resistor loop connected to a second input;
a third operational amplifier circuit connected on a first input to the output of said second operational amplifier;
a reference voltage circuit connected to a second input of said third operational amplifier circuit; and the output of said third operational amplifier circuit being connected to said scram amplifier circuit NOR gate.

12. The apparatus of claim 11 wherein said current limiting circuit first bandstop filter rejects 360 Hz ripple noise.

13. The apparatus of claim 12 wherein the current limiting circuit second operational amplifier circuit has a gain factor of about 100; said third operational amplifier circuit is operated as a comparator; and said reference voltage circuit supplies a regulated voltage of about 6.5 volts.

* * * * *